United States Patent [19]

Bailey

[11] Patent Number: 5,634,678

[45] Date of Patent: Jun. 3, 1997

[54] PORTABLE WASTE RECEIVER FOR ANIMALS, ESPECIALLY DOGS

[76] Inventor: Orthan A. Bailey, 16 Oxford La., Harriman, N.Y. 10926-9716

[21] Appl. No.: 555,368

[22] Filed: Nov. 8, 1995

[51] Int. Cl.$^6$ .............................. A01K 29/00; E01H 1/12
[52] U.S. Cl. .............................................................. 294/1.5
[58] Field of Search .......................... 294/1.3–1.5, 19.1, 294/55; 15/104.8, 257.1, 257.7

[56]  References Cited

U.S. PATENT DOCUMENTS

| | | | |
|---|---|---|---|
| 2,062,023 | 11/1936 | Gosselin | 248/99 |
| 3,431,008 | 3/1969 | Narita | 294/55 |
| 3,522,922 | 8/1970 | Byron | 248/101 |
| 3,614,041 | 10/1971 | Roger | 248/97 |
| 3,659,891 | 5/1972 | Pettenon | 294/19 R |
| 3,679,125 | 7/1972 | Forance | 229/55 |
| 3,688,483 | 9/1972 | Hamilton | 56/400.11 |
| 3,744,453 | 7/1973 | Deitch | 294/1.5 |
| 3,757,737 | 9/1973 | Drum | 119/1 |
| 3,778,097 | 12/1973 | Dorzan | 294/118 |
| 3,802,728 | 4/1974 | Giacopelli | 294/1.4 |
| 3,804,448 | 4/1974 | Schmieler | 294/19 R |
| 3,872,831 | 3/1975 | Cassidy | 119/1 |
| 4,003,595 | 1/1977 | Fano | 294/19 R |
| 4,010,970 | 3/1977 | Campbell | 294/19 R |
| 4,058,337 | 11/1977 | Isac | 294/1.4 |
| 4,130,953 | 12/1978 | Lachance | 294/19 R |
| 4,200,321 | 4/1980 | Warkentin | 294/1 BA |
| 4,247,139 | 1/1981 | Grieb | 294/1.4 |
| 4,686,734 | 8/1987 | Kahan | 15/257.1 |

FOREIGN PATENT DOCUMENTS

| | | | |
|---|---|---|---|
| 2804-553 | 8/1979 | Germany | 294/1.5 |
| 3938-482 | 5/1991 | Germany | 294/1.5 |

*Primary Examiner*—Dean Kramer
*Attorney, Agent, or Firm*—Ladas & Parry

[57] ABSTRACT

A low-cost portable structure for a sanitary device for the collection of animal fecal matter is provided with a telescopic handle on which is supported a disposable collection bag by means of a coupling device a portion of which is formed as part of the ring which supports the collection bag and another part of which is coupled to the handle to receive and permit ready engagement of bayonette-like section which form part of the coupling part which is attached to the annular ring supporting the bag. A tongue is also provided which is engaged by a spring loaded head which facilitates the rapid discharge and of the section which is attached to the ring.

16 Claims, 3 Drawing Sheets

PORTABLE WASTE RECEIVER FOR ANIMALS, ESPECIALLY DOGS

FIELD OF INVENTION

This invention relates to sanitary waste receivers and more particularly to sanitary devices for collecting fecal matter or the like from animals, particularly pets, such as dogs.

BACKGROUND

It is well known that animal fecal matter represents a serious health and environmental problem, particularly in urban areas. Various public interest groups have been formed to protest this situation and legislation has been introduced in state and city legislatures to the effect that owners of animals must provide for the removal of fecal matter excreted by their pets. As a result, there is an urgent need for techniques which will permit animal owners to remove the fecal matter of pets quickly, effectively and in a sanitary manner.

A large number of patents has been granted on the subject matter indicated above. These patents include the following U.S. Pat. Nos.: 2,062,023; 3,431,008; 3,522,922; 3,614,041; 3,659,891; 3,679,125; 3,688,483; 3,757,737; 3,778,097; 3,804,448; 3,872,831; 4,003,595; 4,010,970; 4,103,953 and 4,200,321.

Included in the above listing is U.S. Pat. No. 4,103,953, wherein G. Lachance discloses a portable animal sanitation device of a one-piece frame construction. An annular section is provided with an opening at the end of a handle and the frame is provided with a wire spring slideably displaceable along the annular section. A disposable bag is provided which has a hem for attachment to the annular section. For removal, the wire spring is displaced downwardly and pushes the hem around and off the annular rim for disposal. It will be noted that the annular ring remains as a permanent part of the portable structure.

J. R. Campbell discloses in U.S. Pat. No. 4,010,970 a sanitary waste receiver for dogs wherein a plastic bag with an open top has two upper tubular edge portions which are slipped over two spread-apart arms which support the bag in open position. By means of an associated handle, the bag is placed below a pet to receive the fecal excretion thereof. The arms are used to close and partially seal the bag before its removal from the arms which remain as a permanent part of the disclosed structure.

In U.S. Pat. No. 4,200,321 is disclosed a scoop arm and frame which are forceably urged apart by a spring. A trigger is provided for actuating the scoop arm for scooping up the refuse. A disposable receptacle is provided for receiving the scooped or swept fecal matter. It will be noted that the scoop arm remains as a permanent part of the sanitation device which is disclosed.

J. Fano et al. disclose a sanitary waste receiver wherein a drawband carries a container bag. The drawband is pulled through a slotted locking plate and a hook is provided which engages the drawband in detachable manner. The drawband is flexible and is designed to give up the shape which it desirably has when receiving fecal matter. Although the bag is disposable along with the drawband, it can not be considered as able to maintain the open position of the associated bag for purposes of effective use on a guaranteed basis.

In U.S. Pat. No. 3,431,008, T. Narita provides a portable scavenging device consisting of a box mounted on a stick or pole and having a lid which can be opened and automatically closed. Such a device does not provide for a disposable receptacle which may be readily and conveniently replaced.

In U.S. Pat. No. 3,872,831, A. Cassidy shows a device including a short annular member having an upstanding rim over which maybe folded an outer edge portion of a disposable bag. A retaining arrangement is provided which consists of an extensible element having one end fixed to an annular member and having a free end carrying a fixing means cooperating with a catch carried by the annular member when the extensible element is stretched around the folded over portion of the bag. A hinged lid is provided for closing the bag.

The above and other patents mentioned hereinabove do not disclose the features of the present invention as enumerated hereinafter.

SUMMARY OF INVENTION

It is an object of the invention to provide an improved portable sanitation device which is portable and capable of being operated in simple manner by a person standing upright who can by means of the improved device efficiently and disposably collect fecal matter and the like from animals such as dogs or the like.

It is a further object of the invention to provide an improved device for the collection of fecal matter or the like which can be fabricated of inexpensive, readily available materials and which can be assembled using standard manufacturing techniques for production in large quantities.

It is still a further object of the invention to provide an improved sanitary device which employs inexpensive disposable bags and which does not require frequent cleaning.

Still another of the invention relates to the provision and utilization of a rapid release device which is sanitary and uncomplicated and which may be utilized repeatedly without fear of loss of the ability to function.

Yet another object of the invention is to provide an improved means for coupling a sanitary disposable bag arrangement to a support in such a manner that part of the connection will be disposed of along with the associated collection bag.

Still another object of the invention relates to the provision of an improved construction wherein the collection bag is provided for optional detachment from its support in such a manner as to enable it to be used as a mopping or cleansing unit.

In achieving the above and other objects of the invention there is provided a sanitary device for the receipt of animal fecal matter. This device in accordance with the invention comprises a handle, a receptacle adapted for the receipt of the fecal matter, and a coupling means for coupling the receptacle to the handle. The coupling arrangement includes first and second parts adapted for releasable mating engagement with the first part being positioned on the handle and the second part being connected to the receptacle and including a portion adapted for engagement in the first part and for manipulation to provide for fast release of the receptacle from the handle for disposal of the same with fecal matter therein.

According to a feature of the invention, the first part is attached to the handle and is provided with an opening to receive the aforementioned portion. According to a further feature, the abovementioned handle includes telescopically engaged sections in extension of one another and means to fix the sections together to determine a selected handle length.

According to a preferred embodiment of the invention, the receptacle includes a shape-retaining member and an open-ended bag on said member. The bag is maintained in open condition by the member and the second part mentioned above is mounted on this shape-retaining member. Preferably, the member is of a closed geometrical form and is generally in coplanar relationship with the second part mentioned above. As an example, the member may preferably be an annular ring.

According to still a further feature of the invention, a spring is employed which urges the aforesaid portion out of the first part mentioned hereinabove. Moreover, in a preferred embodiment of the invention the aforesaid portion includes at least one bayonette-type section including a pawl receivable in a further opening provided in the first part mentioned above and extending from the first said opening. Still further, the bayonette-type section will include a resilient tongue displaceably supporting the pawl for release from the associated opening. Yet in greater detail, the abovementioned portion may include a further tongue parallel to the bayonette-type section with the device further including a spring pressing against the tongue when the portion is in the first said part to urge the portion out of this part. Moreover, the portion may include a second bayonette-type section parallel to the first bayonette-type section, the two bayonette-type sections straddling the further tongue mentioned hereinabove.

According to yet another feature of the invention the aforesaid bag may be provided with perforations defining a separable section to permit ready detachment thereof from the shape-retaining member to provide for separate manipulation.

As will be seen hereinafter, the aforesaid bag may be of net or alternatively of paper or plastic. The shape-retaining member and the aforesaid portion are preferably of generally monolithic structure. This monolithic structure is preferably of a low cost disposable material and may be, for example, a plastic or a relatively heavy paper-like substance.

The above and further objects, features and advantages of the invention will be found in the detailed description which follows hereinafter as illustrated in the accompanying drawing.

DETAILED DESCRIPTION

As has been mentioned above, the invention provides a portable sanitation device that can be carried and operated by a person who may be standing in upright position so that that person can efficiently and disposably collect fecal matter discharged by dogs or other animals or pets.

The device of the invention includes a holding device for detachably mounting a disposable perforated collection bag and an annular ring. The holding device incorporates an annular ring over which the flexible edge of a perforated collection bag may be attached. Alternatively, the annular ring and collection bag may be fabricated of a monolithic structure. The device is provided with a long collapsible pole or handle that is attached at its lower end to the annular ring by means of a male and female coupling device. In its extended position, the plane of the annular ring is inclined at an angle of, for example, approximately 135° with respect to the axis of the pole or handle.

For using the device, a perforated collection bag or the like is mounted and retained on the annular ring holder and is attached to the collapsible handle by means of a male and female coupling device as mentioned hereinabove. When the animal indicates by its behavior that it is prepared to excrete fecal matter, the device is held by the handle and positioned so that the annular ring and collection bag are positioned beneath the rectal portion of the animal as, for example, illustrated in FIG. 1 of U.S. Pat. No. 4,010,970. To dispose of the collected fecal matter along with the bag and supporting ring, the ring is positioned over a suitable container and the latch, which will be describe in greater detail hereinafter, is squeezed between the thumb and index finger of the operator. This action will eject the annular ring, collection bag and fecal matter into the receiving container.

Figure 1:
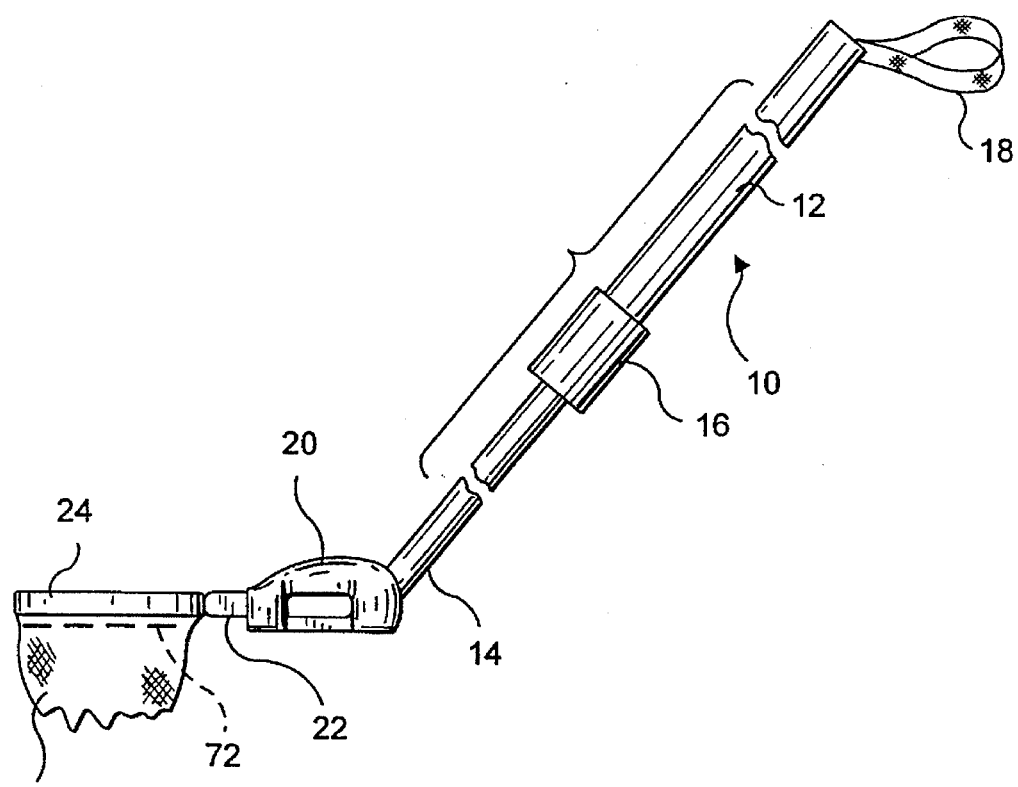
FIG. 1 is a side, partially fragmentary, view of a sanitary device for the collection of excreted fecal matter provided in accordance with the invention.

Referring next to FIG. 1 of the drawing, there is illustrated therein a pole or handle 10 consisting of telescopically engaged parts 12 and 14 which have a common rectilinear axis and are located in extension of one another. Connecting the same for vigorous relative positioning is a locking device 16 of known type which by simple rotation or alternatively by longitudinal displacement fix the parts 12 and 14 together in a position which determines the effective length of the pole or handle 10. It will be noted that, as a matter of convenience, a flexible loop 18 is attached to the part 12. The loop 18 may be fabricated of leather or plastic or the like and represent a convenient means of holding the construction on the arm of an operator. Parts 12 and 14 may be fabricated of plastic or a metal such as aluminum or the like.

At the lower end of the handle 10 is a first part 20 of a coupling mechanism which receives a second part 22 of the coupling mechanism attached to an annular ring 24 supporting a bag 26 for the receipt of discharged fecal matter.

Figure 2:
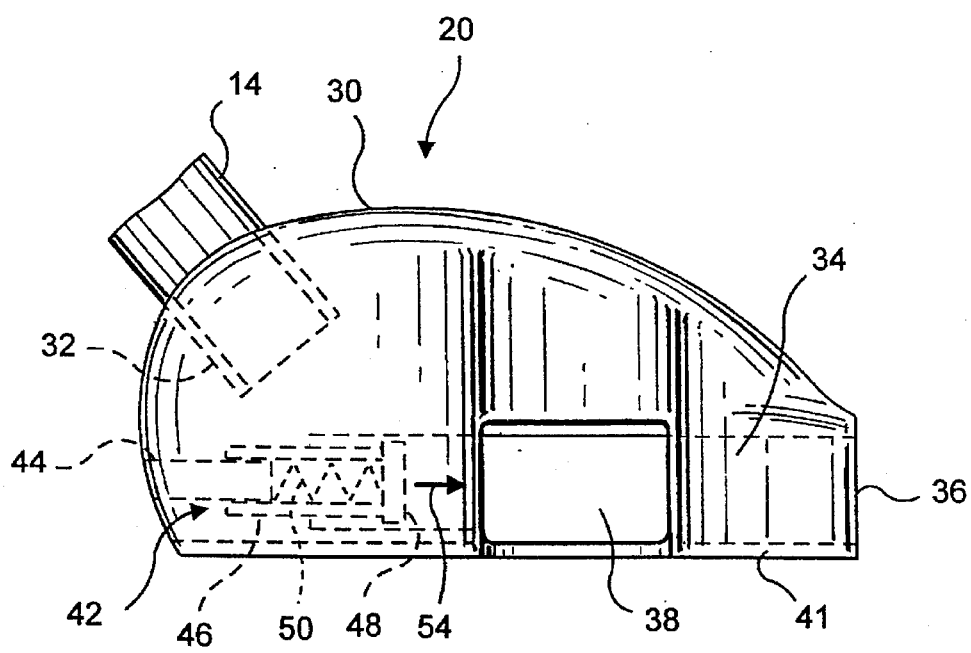
FIG. 2 is a side view partially broken away illustrating a portion of a coupling device for connecting a disposable bag to a handle in accordance with the invention, the view being partially hidden and partially diagrammatic.
Figure 3:
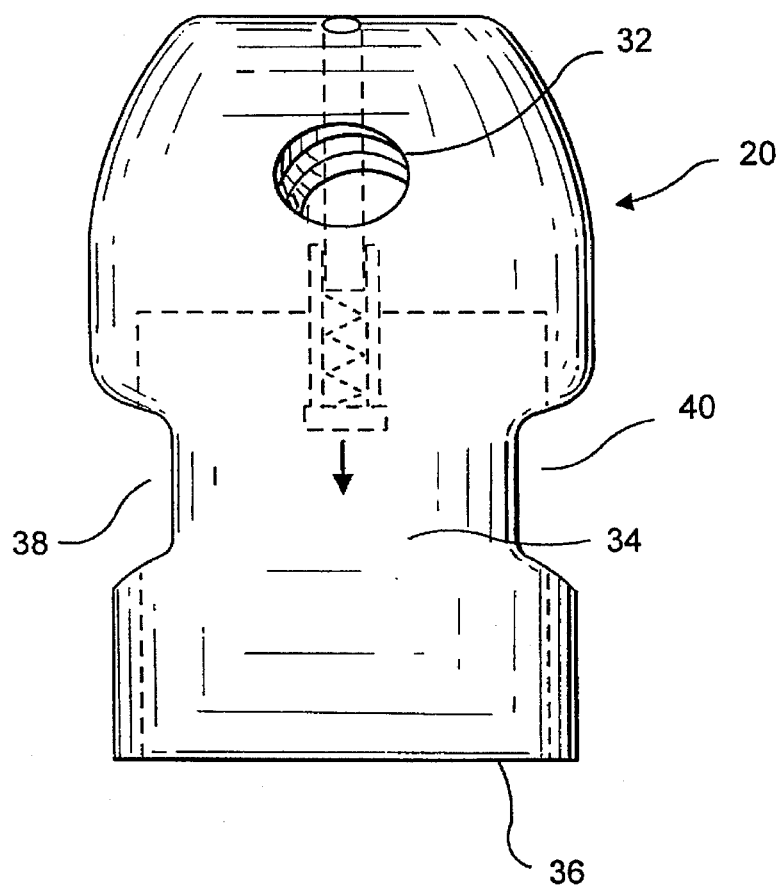
FIG. 3 is a top view partially hidden and somewhat diagrammatical of the component illustrated in FIG. 2.
Figure 4:
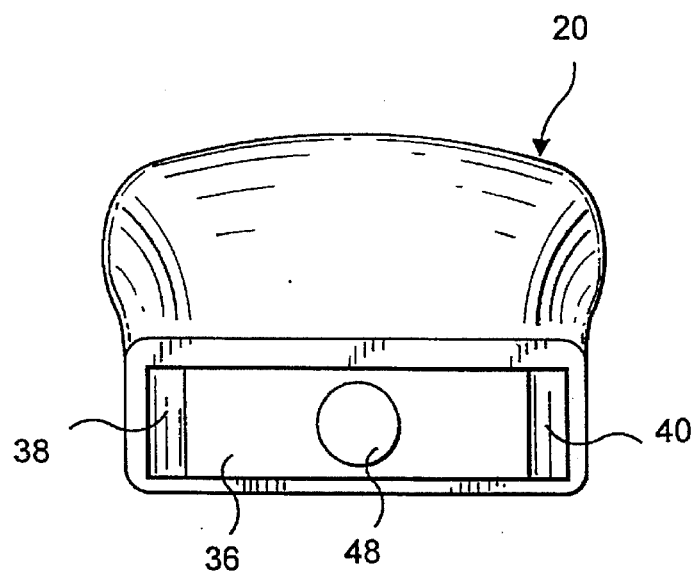
FIG. 4 is a front view of the component illustrated in FIGS. 2 and 3.

The details of the part 20 are best seen in FIGS. 2–4 of the drawing. Therein is shown a body 30 provided with a threaded hole 32 for receiving the correspondingly threaded end of the lower part 14 of the handle 10. The body is provided with an inner chamber 34 having an entrance opening 36 through which is inserted the second part of the coupling device as described hereinbelow.

The body 30 is furthermore provided with lateral openings 38 and 40 which serve to accommodate pawls on the second part of the coupling device as is also described hereinbelow.

The bottom face 41 of the body 30 is preferably a detachable element to facilitate the assembly of the device during manufacture. Also included within the body 30 is a plunger 42 which may be formed of telescopically related parts 44 and 46. A head 48 is provided on this plunger and spring 50 associated therewith urges the head in the direction shown by the arrow 54. The means for holding the telescopically related elements together with the spring 50 under partial compression is not illustrated. It is sufficient to realize at this time that the head 48 is resiliently urged in the direction of arrow 54 for purposes of displacing the second part of the coupling device out of the inner chamber 34 through the front opening 36 for purposes of detaching the ring 24 and bag 26 in rapid and sanitary manner. It is also suitable to note that the openings 38 and 40 provide for engaging resiliently supported pawls by the thumb and forefinger of the operator to permit of the aforesaid release.

Figure 5:
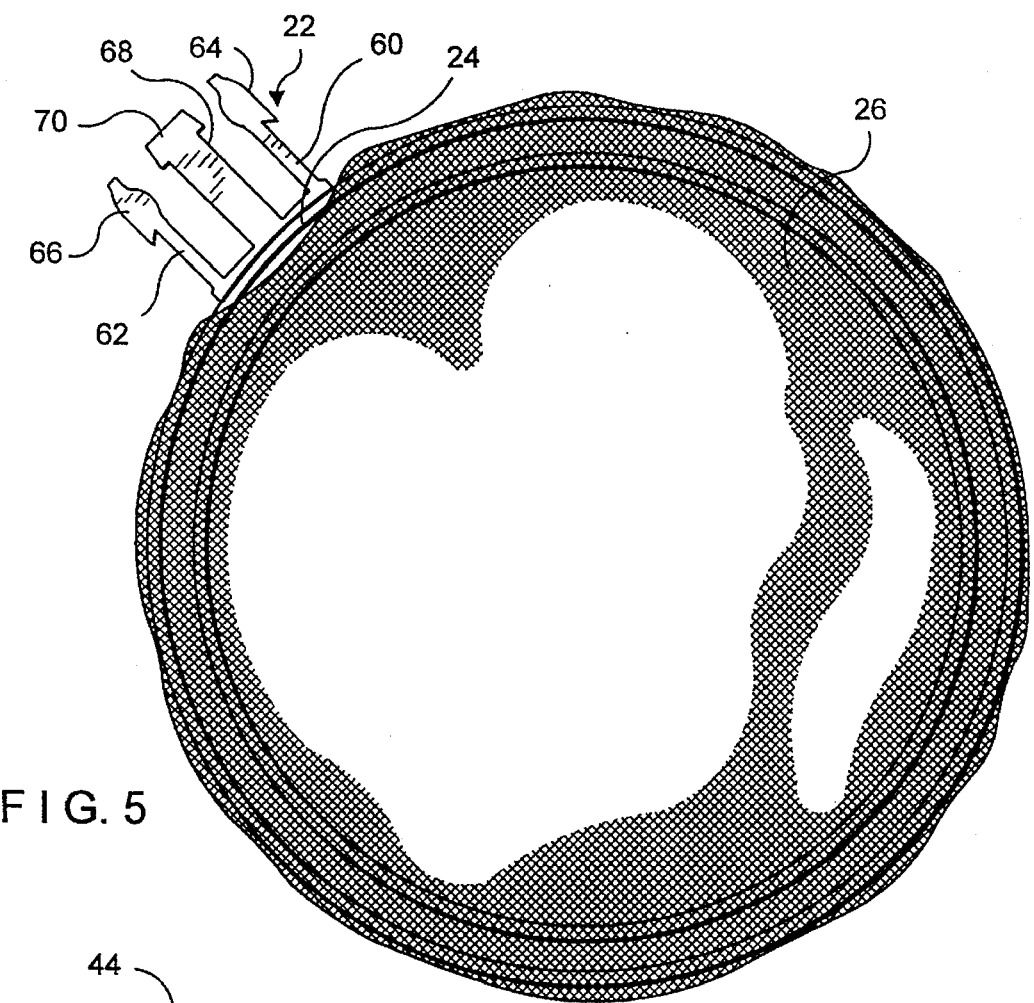
FIG. 5 is a top view of a disposal bag and supporting ring with a part of a coupling device according to the embodiment of the invention illustrated in FIGS. 1–4.

In FIG. 5 is illustrated the annular ring 24 with the second part 22 mounted thereupon preferably in monolithic manner. This part 22 includes bayonette-type sections 60 and 62 which include resilient arms supporting pawls 64 and 66 respectively. These sections 60 and 62 straddle a centrally located tongue 68 the end 70 of which is intended to be engaged by the head 48 of the spring loaded part 46 for rapid and sanitary release of the disposable part of the structure as further referred to hereinbelow.

Also illustrated in FIG. 5 is a bag 26', the open edge of which is engaged around the ring 24. The illustrated embodiment in FIG. 5 shows the bag 26' as being constituted by a net-like material. Referring momentarily back to FIG. 1, it is seen that the bag 26 may also be of a generally imperforate material provided however with perforations 72 by means of which the bag can be detached from the ring 24. This permits the bag which may be of a paper-like material or plastic to be used as a sponge or mop to clean up other fecal material or discharge which escaped capture.

As part of the invention it is preferred that both the ring 24 and the bag 26 as well as the part 22 be disposable. To this end, the bag and ring can be fabricated as a unit preferably with a monolithic structure and the ring 24 and part 22 can also preferably be manufactured as a unitary member with a monolithic structure. For example, the three parts may be fabricated of a plastic or a paper-like substance, such as a heavy paper or cardboard whereof the ring 24 will be of a shape-retaining weight or strength as will the part 22 as long as provision is made for the resiliency of parts 60 and 62 in order that they be able to support the pawls 64 and 66 in displaceable manner.

Figure 6:
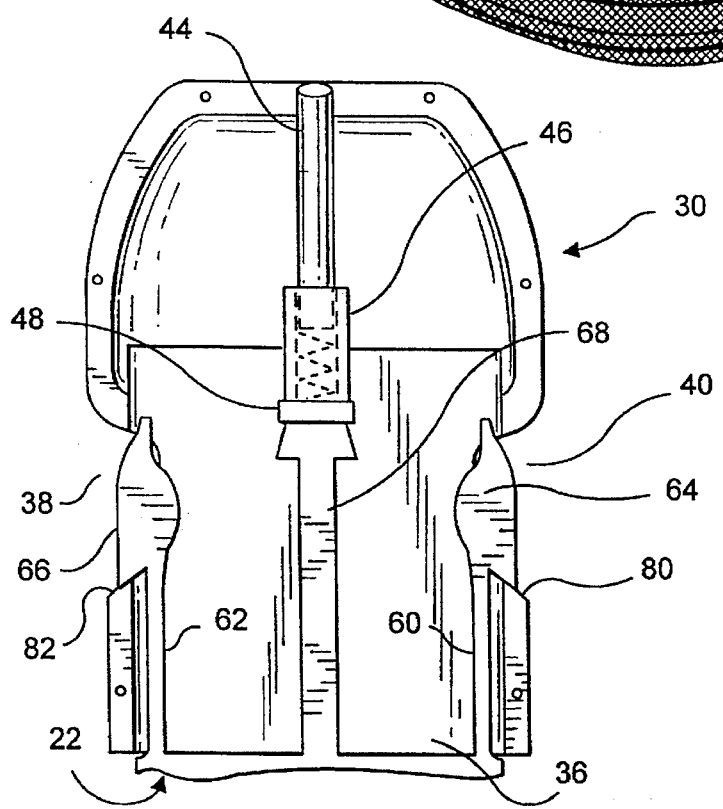
FIG. 6 is a diagrammatic view illustrating how the bag coupling mechanism can be employed in association with the component illustrated in FIGS. 2–4.

FIG. 6 illustrates in diagrammatic manner the coaction of part 22 with the body 30. In this figure diagrammatically appear openings 38 and 40 and the bayonette-type sections 60 and 62 along with the centrally located tongue 68. Also appearing in this figure is the spring loaded head 48 supported on the telescopically related members 44 and 46. The head 48 is urged by a spring (see FIG. 2) against the tongue 68 to urge part 22 out of the front opening 36.

The shapes of the pawls 64 and 66 upon insertion allow the same to pass on insertion around intervening wall structures 80 and 82 and snap into openings 38 and 40. For withdrawal, these pawls can be readily and sanitarily displaced by use of the thumb and forefinger of the operator to permit the spring loaded head 48 to operate against tongue 68 and decouple the device in rapid and sanitary manner. To provide for suitable distribution of forces the ring 24 is preferably of closed geometrical form which is generally in coplanar relationship with the second part 22. As has also been noted, the monolithic structure consisting of the ring 24 and the pawl 22 is preferably of a low cost disposable material having a strength suitable to withstand aforenoted operational steps.

From what has been described above, it will be apparent that there is provided a sanitary fecal matter receptacle which is portable and which is readily manufactured at low cost and which can be easily operated in rapid and sanitary manner. There will be now be obvious to those skilled in the art many modifications and variations of the structure set forth hereinabove. These modifications and variations will not depart from the scope of the invention if defined by any of the following claims.

What is claimed is:

1. A sanitary device for the receipt of animal fecal matter comprising a handle, a receptacle adapted for the receipt of said fecal matter, and a coupling means for coupling said receptacle to said handle and including first and second parts adapted for releasable mating engagement, said first part being positioned on said handle, said second part being connected to said receptacle and including a portion adapted for engagement in said first part and for manipulation to provide for fast release of said receptacle from said handle for disposal of the same with fecal matter therein, said device further comprising a spring engaging said portion and urging said portion out of said first part.

2. A sanitary device as claimed in claim 1, wherein said handle includes telescopically engaged sections in extension of one another, and means to fix the sections together to determine a selected handle length.

3. A sanitary device as claimed in claim 1 wherein said receptacle includes a shape retaining member and an open ended bag on said member, said bag being maintained in open condition by said member, said second part being mounted on said member.

4. A sanitary device as claimed in claim 3 wherein said member is of closed geometrical form and generally in coplanar relationship with said second part.

5. A sanitary device as claimed in claim 4 wherein said member is a ring.

6. A sanitary device as claimed in claim 3 wherein said bag is provided with perforations defining a separable section to permit ready detachment thereof from said shape retaining member to provide for separate manipulation of said section.

7. A sanitary device as claimed in claim 3 wherein said bag is of net.

8. A sanitary device as claimed in claim 3 wherein said bag is of paper or plastic.

9. A sanitary device as claimed in claim 3 wherein said shape retaining member and portion are of generally monolithic structure.

10. A sanitary device as claimed in claim 9 wherein said monolithic structure is of a disposable material.

11. A sanitary device as claimed in claim 10 wherein said material is a plastic or a relatively heavy paper-like substance.

12. A sanitary device for the receipt of animal fecal matter comprising a handle, a receptacle adapted for the receipt of said fecal matter, and a coupling means for coupling said receptacle to said handle and including first and second parts adapted for releasable mating engagement, said first part being positioned on said handle, said second part being connected to said receptacle and including a portion adapted for engagement in said first part and for manipulation to provide for fast release of said receptacle from said handle for disposal of the same with fecal matter therein, said portion including at least one bayonette-type section including a pawl receivable in an opening provided in said first part and extending from said opening.

13. A sanitary device as claimed in claim 12 wherein said first part is attached to said handle and is provided with a further opening to receive said portion.

14. A sanitary device as claimed in claim 12 wherein said bayonette-type section includes a resilient tongue displaceably supporting said pawl for release from said opening.

15. A sanitary device as claimed in claim 14 wherein said portion includes a further tongue parallel to said bayonette-type section, said device further including a spring pressing against the tongue when said portion is in said first part to urge said portion out of said first part.

16. A sanitary device as claimed in claim 15 wherein said portion includes a second bayonette-type section parallel to the first said bayonette-type section, said sections straddling said further tongue.

* * * * *